(12) United States Patent
Liu et al.

(10) Patent No.: US 8,076,919 B2
(45) Date of Patent: Dec. 13, 2011

(54) SWITCH-MODE POWER SUPPLY

(75) Inventors: Vincent Liu, Hsinchu (TW); Yi-Meng Lan, Hsinchu (TW); Ming-Hung Chien, Hsinchu (TW)

(73) Assignee: Holtek Semiconductor Inc., Hsinchu (TW)

( * ) Notice: Subject to any disclaimer, the term of this patent is extended or adjusted under 35 U.S.C. 154(b) by 509 days.

(21) Appl. No.: 12/408,139

(22) Filed: Mar. 20, 2009

(65) Prior Publication Data

US 2010/0128503 A1 May 27, 2010

(30) Foreign Application Priority Data

Nov. 24, 2008 (TW) .............................. 97145401 A

(51) Int. Cl.
*G05F 1/40* (2006.01)

(52) U.S. Cl. ............ 323/285; 323/222; 363/44; 363/82; 363/89

(58) Field of Classification Search .................. 323/222, 323/282–285, 290, 351; 363/44–48, 82, 363/89, 90
See application file for complete search history.

(56) References Cited

U.S. PATENT DOCUMENTS

| 5,757,635 | A  | * | 5/1998 | Seong ............................. 363/89 |
| 5,804,950 | A  | * | 9/1998 | Hwang et al. .................. 323/222 |
| 6,259,613 | B1 | * | 7/2001 | Lee et al. ......................... 363/89 |
| 7,042,743 | B2 | * | 5/2006 | Pidutti et al. .................... 363/89 |
| 7,358,706 | B2 | * | 4/2008 | Lys ................................. 323/222 |
| 7,538,525 | B2 | * | 5/2009 | Kim et al. ...................... 323/205 |
| 2011/0170324 | A1 | * | 7/2011 | Hsieh et al. ..................... 363/75 |

* cited by examiner

*Primary Examiner* — Jessica Han
(74) *Attorney, Agent, or Firm* — Volpe and Koenig, P.C.

(57) ABSTRACT

Disclosed is a Power Factor Correction Controller, which comprises a boost converter, a current sensing unit, an arithmetic unit, and a switch driving unit. The current sensing unit can sense or derive the current that pass through the energy delivery device, which is normally implemented by a diode or a switch. The current sensing unit can also sense the inductor current, or the switch current. With the current sensing unit, the arithmetic unit can calculate the optimum switch on-time or when to turn off the switch, without direct-sensing of the load. The disclosed method reduces the system cost by removing the needs to sense the load condition as in the prior arts. The disclosed method also improves the system response by sensing the delivered current at energy delivery side, rather than the receiver side as in the prior arts.

20 Claims, 5 Drawing Sheets

SWITCH-MODE POWER SUPPLY

FIELD OF THE INVENTION

The present invention relates to switch-mode power supplies (SMPS), and more particularly, to power factor correction (PFC) circuits in switch-mode power supplies (SMPS).

BACKGROUND OF THE INVENTION

The power factor (PF) which can be achieved with an active switch-mode PFC controller is nearly 1 (i.e. 100%). The use of PFC controller, therefore, minimizes the power wasted in the harmonics and out-of-phase current.

A PFC converter is generally configured as a boost converter, with an inductor, a switch, and an energy delivery device. The energy delivery device is normally implemented as a diode or a MOS. The PFC controller controls on and off of the switch and diode to achieve unity power factor and to provide regulated DC output.

A PFC controller can be operated in continuous conduction mode (CCM), critical conduction mode (CRM), or discontinuous conduction mode (DCM). CRM and DCM modes are normally the choice for lower power consumption applications.

To provide load regulation for PFC output, a common method is used to sense the output voltage directly. The sensed output voltage is feedbacked to PFC controller to adjust the switch on/off timing. This conventional practice complicates the system design, and increases the board area and components.

Please refer to FIG. 1, which is a schematic diagram showing a conventional PFC switch-mode power supply having a load sense circuit to sense voltage at the converter output according to the prior art. In FIG. 1, the general configuration of the switch-mode power supply has a boost converter 11 and a PFC controller 12. The boost converter 11 is configured by an inductor 114, a resistor 117, an output stage 118, as well as an energy delivery device. The energy delivery device is usually implemented by a diode 115 or a transistor switch 116. The PFC controller 12 is configured by a AC voltage sense unit 121, an inductor current sense unit 122, a load sense unit 123, an arithmetic unit 124, a comparator 125 and a switch control unit 126. The PFC controller 12, through the load sense unit 123, senses the voltage from the load output stage 118 to control the on/off of the switch 116 and diode 115, realizes the effect promotion of the power factor, and provides a regulated DC voltage output.

Please refer to FIG. 2, which is a schematic diagram showing another conventional PFC switch-mode power supply having a load sensing circuit to sense voltage at the converter output according to the prior art. In FIG. 2, the general configuration of the switch-mode power supply has a boost converter 21 and a PFC controller 22. The boost converter 21 is configured by an inductor 214, an output stage 217, as well as an energy delivery device. The energy delivery device is usually implemented by a diode 215 or a transistor switch 216. The PFC controller 22 is configured by a AC voltage sense unit 221, an inductor current sense unit 222, a load sense unit 223, an arithmetic unit 224, a switch on-time unit 225, and a switch control unit 226. The PFC controller 22, through the load sense unit 223, senses the voltage from the load output stage 217 to control the on/off of the switch 216 and diode 215, realizes the effect promotion of the power factor, and provides a regulated DC voltage output.

Although a regulated output voltage can be provided by a conventional switch-mode power supply according to the prior art, it can only be realized by adding an additional sense unit. Therefore, the increases of the weight, components and the board area are still the inevitable defects of the prior art.

A solution of the above drawback in the prior art is not only to remove the voltage sense circuit from the load terminal of the switch-mode power supply but also to decrease the overall weight, components and the board area. Thus the invention of the case "switch-mode power supplies" would be the best way to solve the deficiencies of conventional means.

SUMMARY OF THE INVENTION

The present invention provides a switch-mode power supply for use in power factor correction. The switch-mode power supply includes an inductor, a switch, an energy delivery device, and an inductor current sensing circuit to produce and output at critical points of inductor current changes. The load-terminal output voltage detection circuit can be removed so as to reduce the overall weight and volume.

According to an aspect of the present invention, there is provided a switch-mode power supply for providing an output voltage, including a boost converter enhancing a level of the output voltage according to an internal inductor current, an AC voltage and a switch current, a switch current sensing unit sensing the switch current to provide a reference potential, an arithmetic unit receiving the internal inductor current, the AC voltage and the sensed switch current to provide a test potential, and a comparator comparing the reference potential with the test potential and providing a reset signal to activate the boost converter.

Preferably, the output voltage is provided according to an input voltage being a utility line AC power.

Preferably, the boost converter has an EMI-protection circuit, a rectifier, an energy storage device and an output stage, the switch current sensing unit, the arithmetic unit and the comparator are configured in a power factor correction controller coupled to the boost converter, and the arithmetic unit operates the internal inductor current, the AC voltage and the sensed switch current to provide the test potential.

Preferably, the rectifier is a full-bridge rectifier.

Preferably, the energy storage device includes an inductor providing the internal inductor current, a switch having an input terminal, a controlling terminal and an output terminal, wherein the input terminal is coupled with the inductor and the switch is controlled by the reset signal, a resistor coupled to the output terminal of the switch to provide the switch current, and a diode coupled to the inductor and the input terminal of the switch.

Preferably, the switch is a transistor.

Preferably, the output stage includes a filter capacitor connected to the energy storage device in parallel, and an output load connected to the filter capacitor in parallel to provide the output voltage.

Preferably, the switch-mode power supply further includes an inductor current sensing unit coupled to the boost converter to sense the internal inductor current, provides the sensed inductor current to the arithmetic unit, an AC voltage sensing unit coupled to the boost converter to sense the AC voltage, and provides the sensed AC voltage to the arithmetic unit, and a switch control unit is coupled to the boost converter and receives the reset signal to activate the boost converter.

Preferably, the inductor current sensing unit provides a setting signal to the switch control unit according to the internal inductor current and controls a switching action of the boost converter.

According to another aspect of the present invention, there is provided a switch-mode power supply, including a boost converter, an arithmetic unit coupled to the boost converter, receiving an inductor current and an AC voltage and providing a reset signal, and a switch on-time unit receiving and transmitting the reset signal to activate the boost converter.

Preferably, the output voltage is provided according to an input voltage being a utility line AC power.

Preferably, the boost converter has an EMI-protection circuit, a rectifier, an energy storage device and an output stage and enhances a level of the output voltage according to the inductor current and the AC voltage, and the arithmetic unit and the switch on-time unit are configured in a power factor correction controller coupled to the boost converter.

Preferably, the rectifier is a full-bridge rectifier.

Preferably, the energy storage device includes: an inductor providing the inductor current, a switch having an input terminal, a controlling terminal and an output stage, wherein the input terminal is coupled with the inductor and the switch is controlled by the reset signal, and a diode coupled to the inductor and the input terminal of the switch.

Preferably, the switch is a transistor.

Preferably, the output stage includes: a filter capacitor connected to the energy storage device in parallel, and an output load connected to the filter capacitor in parallel to provide the output voltage.

Preferably, the switch-mode power supply further includes an inductor current sensing unit coupled to the boost converter to sense the inductor current, provides the sensed inductor current to the arithmetic unit, an AC voltage sensing unit coupled to the boost converter to sense the AC voltage, and provides the sensed AC voltage to the arithmetic unit, and a switch control unit is coupled to the boost converter and receives the reset signal to activate the boost converter.

Preferably, the inductor current sensing unit further provides a setting signal to the switch control unit according to the inductor current and controls a switching action of the boost converter.

According to an additional aspect of the present invention, there is provided a power supply including a sensing unit sensing a switch current to provide a reference potential, a calculating unit receiving an inductor current, an AC voltage and the sensed switch current to provide a test potential, and a comparator comparing the reference potential with the test potential and providing a reset signal.

Preferably, the power supply generates an output voltage and further including a boost converter being activated by the reset signal and enhancing a level of the output voltage according to the inductor current, the AC voltage and the switch current.

The foregoing and other features and advantages of the present invention will be more clearly understood through the following descriptions with reference to the drawings, wherein:

DETAILED DESCRIPTION OF THE PREFERRED EMBODIMENT

The present invention will now be described more specially with reference to the following embodiments. It is to be noted that the following descriptions of preferred embodiments of this invention are presented herein for the purposes of illustration and description only; it is not intended to be exhaustive or to be limited to the precise form disclosed.

Figure 1:
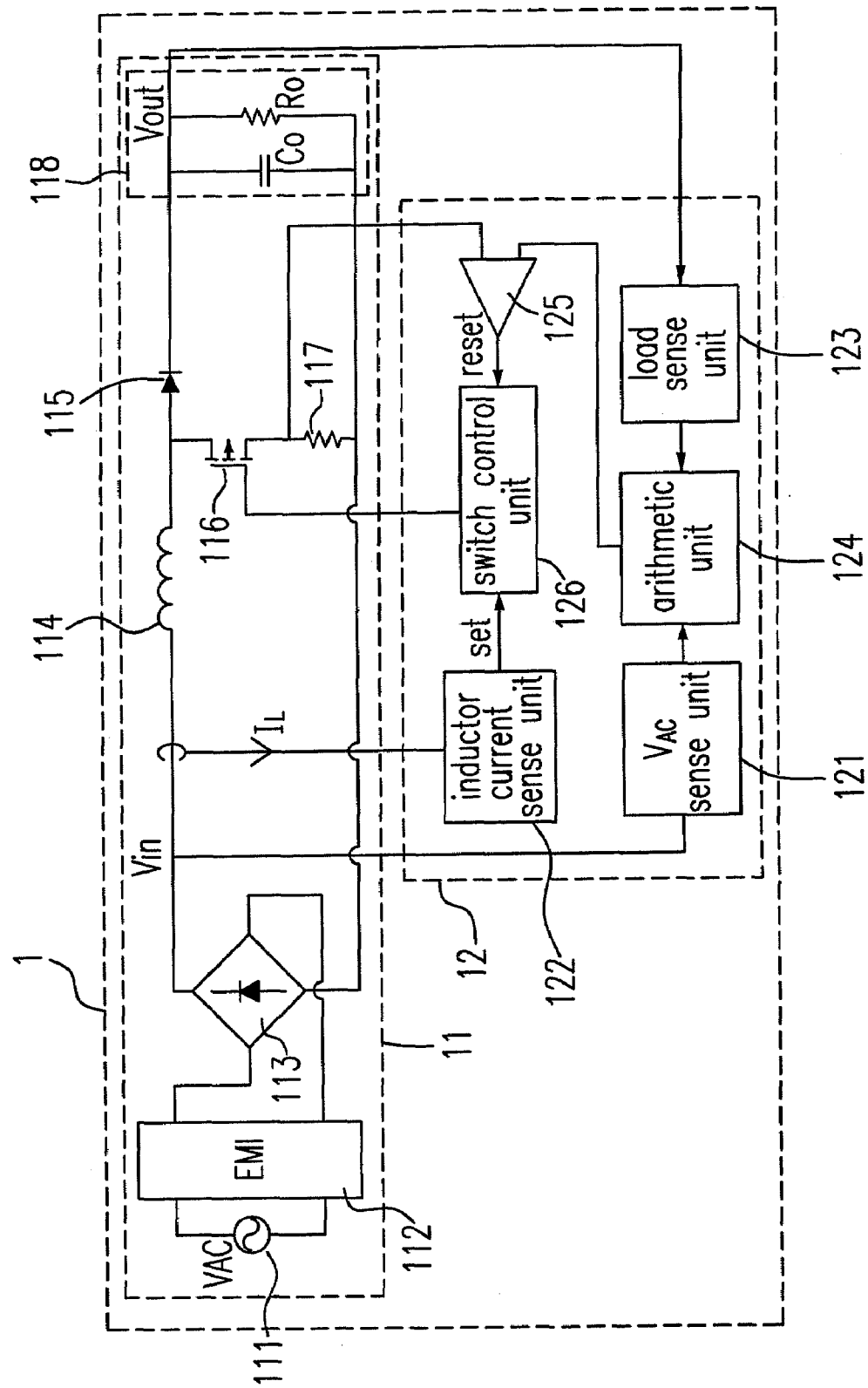
FIG. 1 is a schematic diagram showing a conventional PFC switch-mode power supply having a load sense circuit to sense voltage at the converter output according to the prior art.
Figure 2:
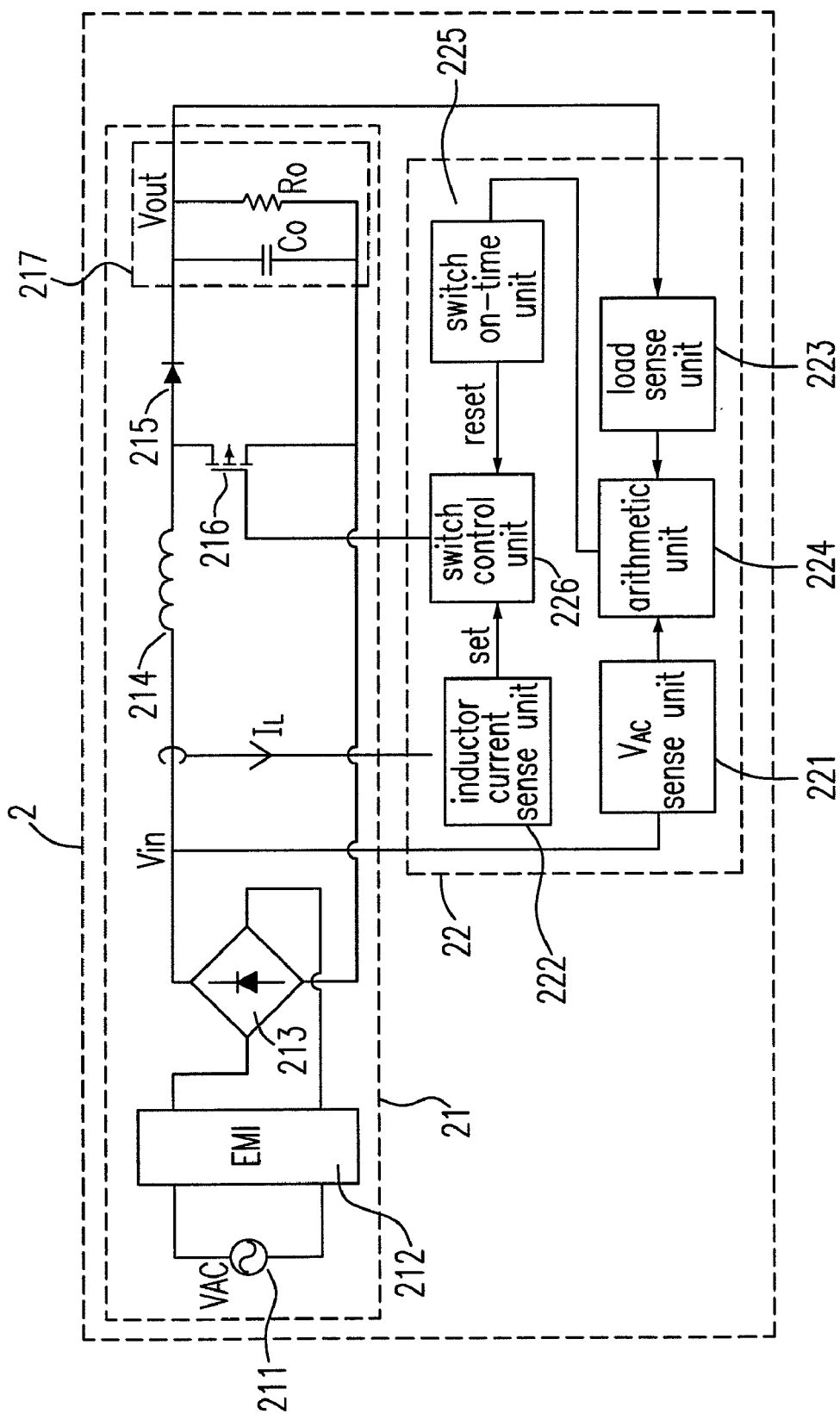
FIG. 2 is a schematic diagram showing another conventional PFC switch-mode power supply having a load sensing circuit to sense voltage at the converter output according to the prior art.
Figure 3:
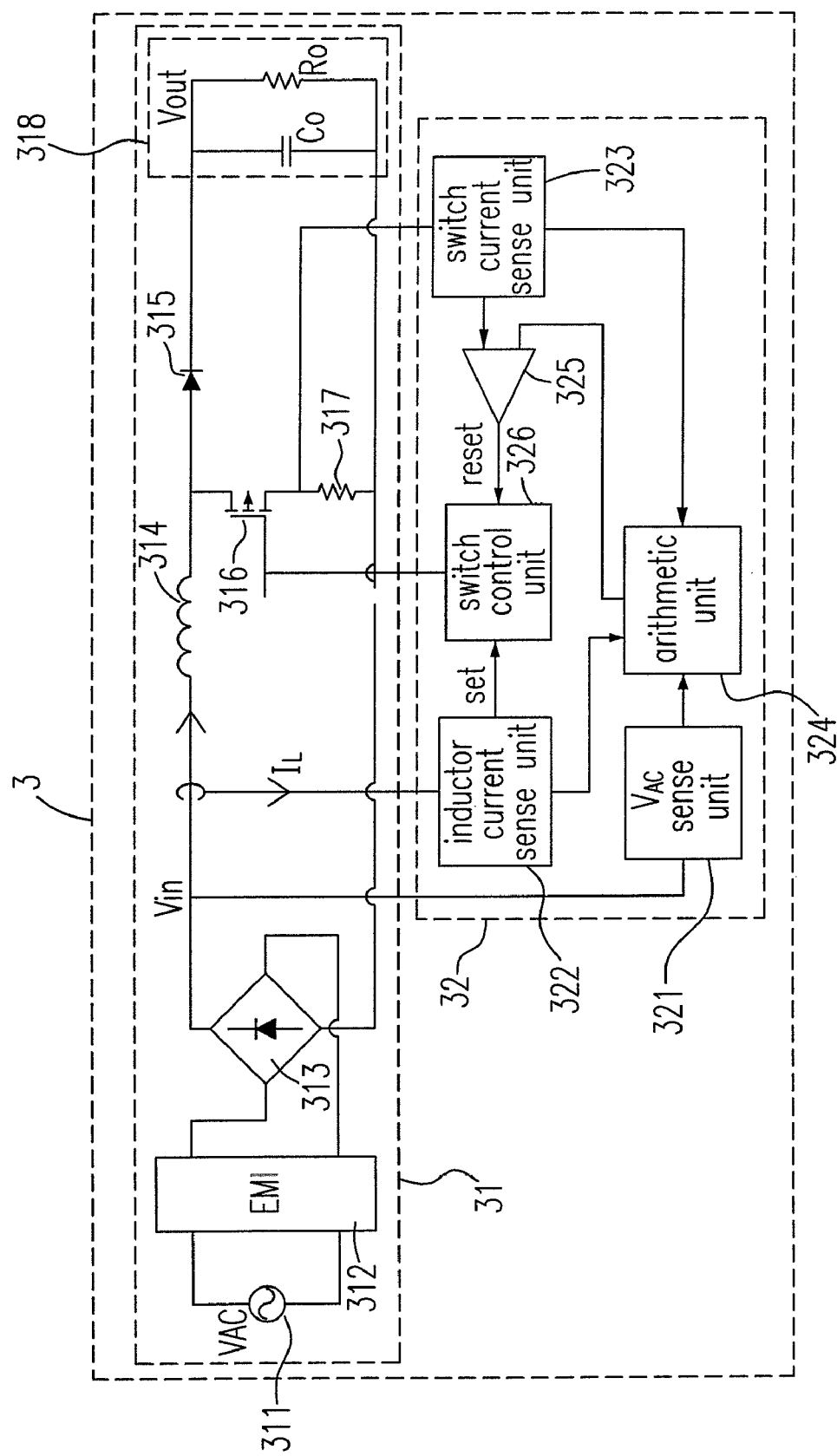
FIG. 3 is an exemplary schematic block diagram of PFC switch-mode power supply with load regulation without output voltage sensing.

Please refer to FIG. 3, which is an exemplary schematic block diagram showing a PFC switch-mode power supply with load regulation without output voltage sensing according to the first embodiment of the present invention. The PFC switching power supplies 3 includes a boost converter 31 and a PFC controller 32. The boost converter 31 includes a utility line AC power input stage 311, an EMI protection circuit 312, a rectifier 313, a inductor 314, a diode 315, a switch 316, a resistor 317 and an output stage 318. The PFC controller 32 includes an AC voltage sense unit 321, an inductor current sense unit 322, a switch current sense unit 323, an arithmetic unit 324, a comparator 325 and a switch control unit 326.

In FIG. 3, AC voltage VAC is received by the utility line AC power input stage 311, through EMI protection circuit 312 and rectifier 313, turning into an input voltage Vin. Then the input voltage Vin is sensed by the AC voltage sense unit 321 coupled to the boost converter 31. At the same time, the inductor current detection unit 322 coupled to the boost converter 31 also senses the inductor current IL. According to the inductor current IL, the inductor current sense unit 322 provides a set signal to switch control unit 326 to control the action of the switch 316 of the boost converter 31.

The arithmetic unit 324 receives and processes three signals individually from the switch current sense unit 323, the inductor current sense unit 322 and the AC voltage sense unit 321 to provide a test potential to the comparator 325. The comparator 325 compares the test potential generated from the arithmetic unit 324 and the reference potential sensed from the switch current sense unit 323 to provide a reset signal to the switch control unit 326, to control the action of the switch 316 of the boost converter 31 based on the reset signal.

If the reference potential is less than the test potential, the switch peak current increases and the reset signal turns off the switch 316, allowing more energy to be sent to load output stage 318. If the reference potential is higher than the test potential, the switch peak current decreases and the switch 316 turns on. It limits the energy sent to the load output stage 318 to control the output potential no longer increased.

Figure 4:
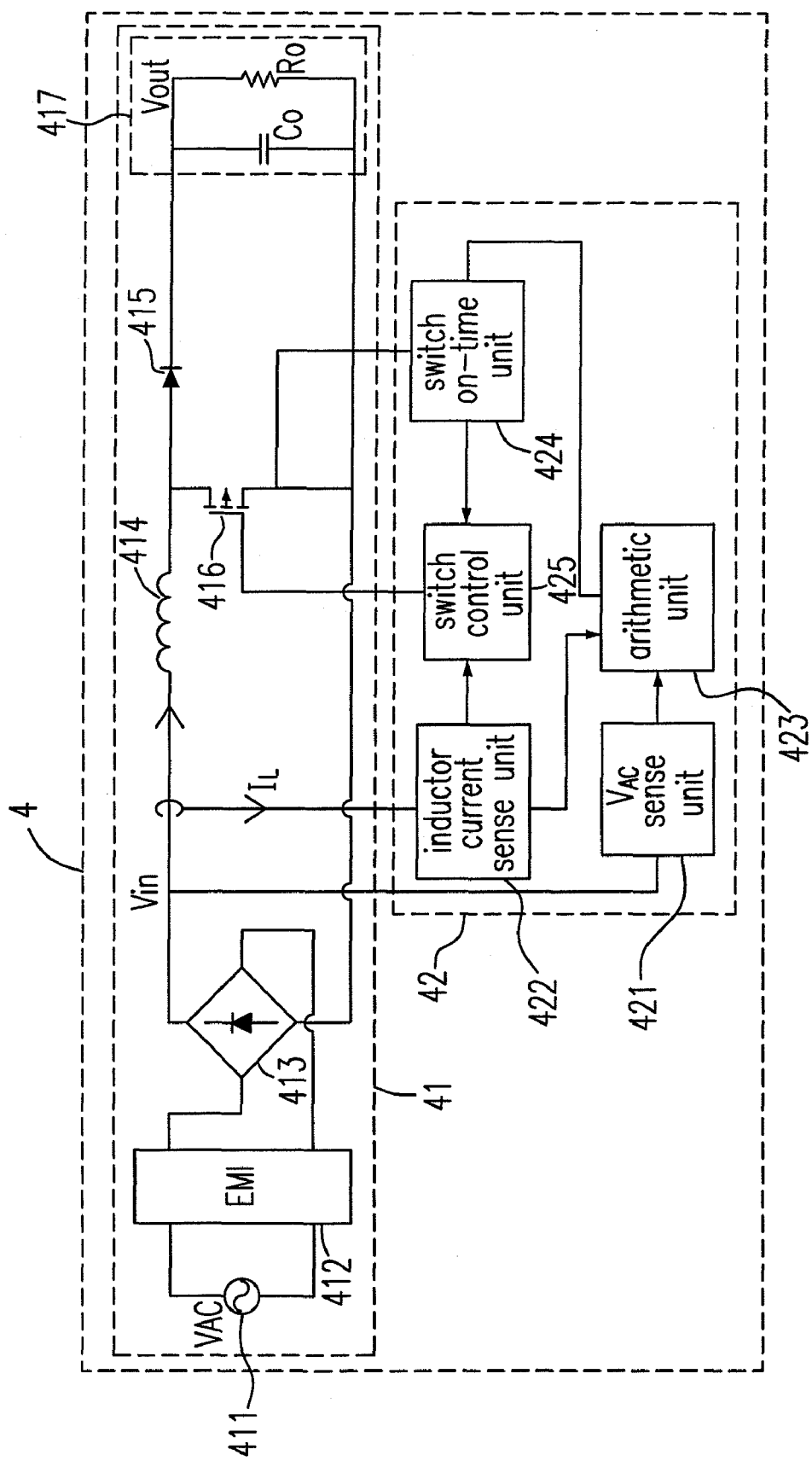
FIG. 4 is another exemplary schematic block diagram of PFC switch-mode power supply with load regulation without output voltage sensing.

Please refer to FIG. 4, which is an exemplary schematic block diagram showing a PFC switch-mode power supply with load regulation without output voltage sensing according to the second embodiment of the present invention. The PFC switching power supplies 4 includes a boost converter 41 and a PFC controller 42. The boost converter 41 includes a utility line AC power input stage 411, an EMI protection circuit 412, a rectifier 413, a inductor 414, a diode 415, a switch 416 and an output stage 417. The PFC controller 42 includes an AC voltage sense unit 421, an inductor current sense unit 422, an arithmetic unit 423, a switch on-time unit 424 and a switch control unit 425.

In FIG. 4, AC voltage VAC is received by the utility line AC power input stage 411, through EMI protection circuit 412 and rectifier 413, turning into an input voltage Vin. Then the input voltage Vin is sensed by the AC voltage sense unit 421 coupled to the boost converter 41. At the same time, the inductor current detection unit 422 coupled to the boost converter 41 also sense the inductor current IL. According to the inductor current IL, the inductor current sense unit 422 provides a set signal to switch control unit 425 to control the action of the switch 416 of the boost converter 41.

The arithmetic unit 423 receives and processes two signals individually from the inductor current sense unit 422 and the AC voltage sense unit 421 to provide a reset signal to the switch on-time unit 424. Thus the switch control unit 425 can control the action of the switch 416 of the boost converter 41 based on the reset signal from the switch on-time unit 424.

In the boost converter 41, the switch on-time unit 424 determines whether the energy will be stored in the inductor 414 or not. The time of the diode 415 turned on determine whether the energy will be transferred to the load terminal 415 or not. The boost converter 4 operates in discontinuous conduction mode or boundary conduction mode, the relation between the switch 416 on-time and the diode 415 (energy delivery device) on-time is given by:

$$\frac{td}{ton} = \frac{Vin}{Vout - Vin},$$

Here, "td" is the on-time of the diode 415 (energy delivery device). "ton" is the on-time of the switch 416. "Vin" is the boost converter 41 input voltage. "Vout" is the converter 41 output voltage. With "td", "ton", and "Vin" known, the "Vout" can be derived without direct sensing.

In particular, "ton" have a fixed relationship with "Vout" for a power factor correction converter, as depicted by:

$$\sum \left(\frac{ton}{T}\right)^2 = K \cdot \frac{Vout}{V_{rms}^2}(Vout - Vin)$$

Here, "T" is cycle time of the switch, K is a constant depends on loading and converter configuration, and Vrms is the input root-mean-square average. The "Vout" derived from "td" can be used in this equation to calculate an optimized on-time. Therefore, both the inductor 414 peak and zero currents are sensed by inductor current sensing unit 422. Peak and zero current events are sent to arithmetic unit 423 to calculate for the "td" and then derived for the "Vout". The calculated "Vout" is then sent from arithmetic unit 423 to the switch on-time unit 424. On-time of the switch 416 will be longer if the Vout is less than desired voltage "Vref". On-time of the switch 416 will be shorter if the Vout is larger than desired voltage "Vref".

Figure 5A:
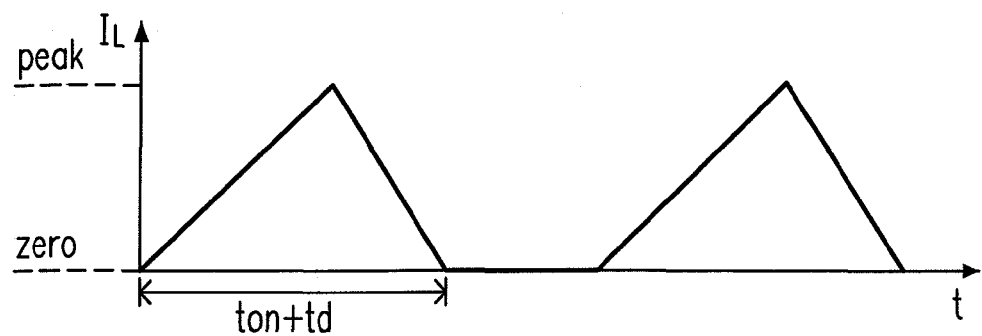
FIG. 5 is the current and timing waveform for inductor, switch, and diode, in a DCM mode PFC switch-mode power supply.
Figure 5B:
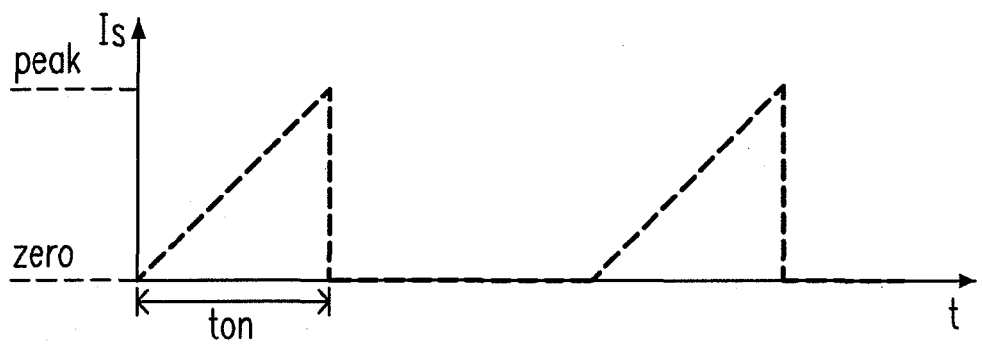
Figure 5C:
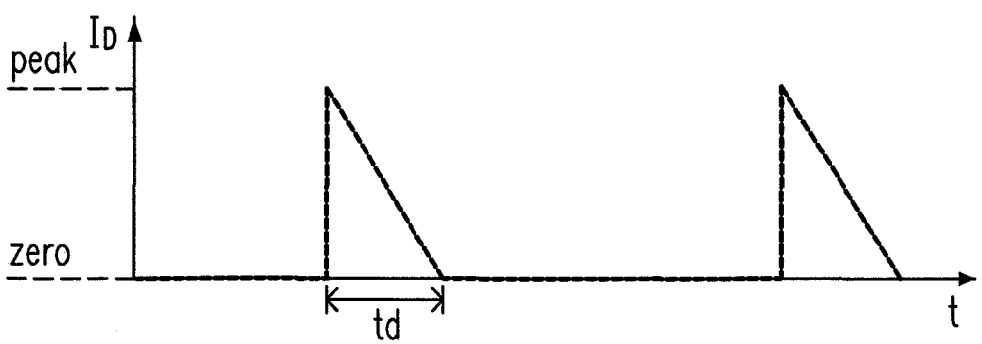

Please refer to FIG. 5, which is the current and timing waveform for inductor, switch, and diode, in a DCM mode PFC switch-mode power supply. FIG. 5(a) shows the changing relationship between the inductor current IL and the time t, wherein the vertical-axis represents the sensed inductor current IL, the horizontal-axis represents the time t. On the horizontal-axis, "ton" is the duration when the switch is turned on, and "td" is the duration when the diode is turned on. The inductor current in periods of the "td" and "ton" can always be sensed (such as the solid line showed), and at the same time the inductor zero and peak current can be measured. FIG. 5(b) shows the changing relationship between the switch current Is and the time t, wherein the vertical-axis represents the sensed switch current Is, the horizontal-axis represents the time t. On the horizontal-axis, "ton" is the duration when the switch is turned on. The switch current in periods of the "td" and "ton" can always be sensed (such as the dotted line showed). FIG. 5(c) shows the changing relationship between the diode current ID and the time t, wherein the vertical-axis represents the sensed diode current ID, the horizontal-axis represents the time t. On the horizontal-axis, "td" is the duration when the diode is turned on. The diode current in periods of the "td" can be sensed (such as the dotted line showed).

According to the above graph of FIGS. 5(a), (b) and (c), we can find "ton" is the time sensed from the inductor zero current to peak current, which is the time sensed from the switch zero current to peak current. "td" is the time sensed from the inductor peak current to zero current, which is the time from the switch peak current to the inductor zero current. Therefore, the sensing of "td" requires no extra devices, and both the zero current of the inductor and the peak current of the switch can be sensed. In either cases, the "ton" and "td" will be known, and therefore "Vout" can be derived.

To sum up, both the inductor zero current and the peak current can be sensed in the first embodiment of the present invention and both the inductor zero current and the switch peak current can be sensed in the second embodiment of the present invention. Therefore, under either case, "td" and "ton" are always known, the "Vout" can be derived without any load sense unit.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A switch-mode power supply for providing an output voltage, comprising:
    a boost converter enhancing a level of the output voltage according to an internal inductor current, an AC voltage and a switch current;
    a switch current sensing unit sensing the switch current to provide a reference potential;
    an arithmetic unit receiving the internal inductor current, the AC voltage and the sensed switch current to provide a test potential; and
    a comparator comparing the reference potential with the test potential and providing a reset signal to activate the boost converter.

2. A switch-mode power supply according to claim 1, wherein the output voltage is provided according to an input voltage being a utility line AC power.

3. A switch-mode power supply according to claim 1, wherein the boost converter has an EMI-protection circuit, a rectifier, an energy storage device and an output stage, the switch current sensing unit, the arithmetic unit and the comparator are configured in a power factor correction controller coupled to the boost converter, and the arithmetic unit operates the internal inductor current, the AC voltage and the sensed switch current to provide the test potential.

4. A switch-mode power supply according to claim 3, wherein the rectifier is a full-bridge rectifier.

5. A switch-mode power supply according to claim 3, wherein the energy storage device comprises:

an inductor providing the internal inductor current;
a switch having an input terminal, a controlling terminal and an output terminal, wherein the input terminal is coupled with the inductor and the switch is controlled by the reset signal;
a resistor coupled to the output terminal of the switch to provide the switch current; and
a diode coupled to the inductor and the input terminal of the switch.

6. A switch-mode power supply according to claim 5, wherein the switch is a transistor.

7. A switch-mode power supply according to claim 3, wherein the output stage comprises:
a filter capacitor connected to the energy storage device in parallel; and
an output load connected to the filter capacitor in parallel to provide the output voltage.

8. A switch-mode power supply according to claim 1, further comprising:
an inductor current sensing unit coupled to the boost converter to sense the internal inductor current and providing the sensed inductor current to the arithmetic unit;
an AC voltage sensing unit coupled to the boost converter to sense the AC voltage and providing the sensed AC voltage to the arithmetic unit; and
a switch control unit coupled to the boost converter and receiving the reset signal to activate the boost converter.

9. A switch-mode power supply according to claim 8, wherein the inductor current sensing unit provides a setting signal to the switch control unit according to the internal inductor current and controls a switching action of the boost converter.

10. A switch-mode power supply, comprising:
a boost converter;
an arithmetic unit coupled to the boost converter, receiving an inductor current and an AC voltage and providing a reset signal; and
a switch on-time unit receiving and transmitting the reset signal to activate the boost converter.

11. A switch-mode power supply according to claim 10 providing an output voltage according to an input voltage being a utility line AC power.

12. A switch-mode power supply according to claim 11, wherein the boost converter has an EMI-protection circuit, a rectifier, an energy storage device and an output stage and enhances a level of the output voltage according to the inductor current and the AC voltage, and the arithmetic unit and the switch on-time unit are configured in a power factor correction controller coupled to the boost converter.

13. A switch-mode power supply according to claim 12, wherein the rectifier is a full-bridge rectifier.

14. A switch-mode power supply according to claim 12, wherein the energy storage device comprises:
an inductor providing the inductor current;
a switch having an input terminal, a controlling terminal and an output stage, wherein the input terminal is coupled with the inductor and the switch is controlled by the reset signal; and
a diode coupled to the inductor and the input terminal of the switch.

15. A switch-mode power supply according to claim 14, wherein the switch is a transistor.

16. A switch-mode power supply according to claim 12, wherein the output stage comprises:
a filter capacitor connected to the energy storage device in parallel; and
an output load connected to the filter capacitor in parallel to provide the output voltage.

17. A switch-mode power supply according to claim 10, further comprising:
an inductor current sensing unit coupled to the boost converter to sense the inductor current and providing the sensed inductor current to the arithmetic unit;
an AC voltage sensing unit coupled to the boost converter to sense the AC voltage and providing the sensed AC voltage to the arithmetic unit; and
a switch control unit coupled to the boost converter and receiving the reset signal to activate the boost converter.

18. A switch-mode power supply according to claim 17, wherein the inductor current sensing unit further provides a setting signal to the switch control unit according to the inductor current and controls a switching action of the boost converter.

19. A power supply, comprising:
a sensing unit sensing a switch current to provide a reference potential;
a calculating unit receiving an inductor current, an AC voltage and the sensed switch current to provide a test potential; and
a comparator comparing the reference potential with the test potential and providing a reset signal.

20. A power supply according to claim 19 generating an output voltage and further comprising:
a boost converter being activated by the reset signal and enhancing a level of the output voltage according to the inductor current, the AC voltage and the switch current.

* * * * *